(12) United States Patent
Lawandy

(10) Patent No.: US 11,501,593 B2
(45) Date of Patent: Nov. 15, 2022

(54) MACHINE-READABLE POLYMER SECURITY THREADS

(71) Applicant: Spectra Systems Corporation, Providence, RI (US)

(72) Inventor: Nabil Lawandy, Saunderstown, RI (US)

(73) Assignee: Spectra Systems Corporation, Providence, RI (US)

( * ) Notice: Subject to any disclaimer, the term of this patent is extended or adjusted under 35 U.S.C. 154(b) by 0 days.

(21) Appl. No.: 16/848,930

(22) Filed: Apr. 15, 2020

(65) Prior Publication Data

US 2021/0327194 A1  Oct. 21, 2021

(51) Int. Cl.
| | | |
|---|---|---|
| *G07D 7/00* | (2016.01) | |
| *G07D 7/202* | (2016.01) | |
| *G07D 7/004* | (2016.01) | |
| *G01N 21/33* | (2006.01) | |
| *G01N 21/3581* | (2014.01) | |
| *G07D 7/121* | (2016.01) | |
| *G07D 7/1205* | (2016.01) | |
| *B42D 25/29* | (2014.01) | |
| *B42D 25/351* | (2014.01) | |
| *B42D 25/355* | (2014.01) | |

(52) U.S. Cl.
CPC ............. *G07D 7/205* (2013.01); *G01N 21/33* (2013.01); *G01N 21/3581* (2013.01); *G07D 7/004* (2013.01); *G07D 7/121* (2013.01); *G07D 7/1205* (2017.05); *B42D 25/29* (2014.10); *B42D 25/351* (2014.10); *B42D 25/355* (2014.10); *G07D 2207/00* (2013.01)

(58) Field of Classification Search
CPC ...... G07D 7/205; G07D 7/1205; G07D 7/004; G07D 7/121; G01N 21/33; G01N 21/3581
USPC .......................................................... 356/51
See application file for complete search history.

(56) References Cited

U.S. PATENT DOCUMENTS

| | | | | |
|---|---|---|---|---|
| 8,171,567 B1* | 5/2012 | Fraser | ..................... | G06F 21/64 |
| | | | | 726/32 |
| 2010/0140501 A1* | 6/2010 | Lawandy | ............. | G07D 7/1205 |
| | | | | 250/459.1 |
| 2012/0299287 A1* | 11/2012 | Eichenberger | ....... | B42D 25/346 |
| | | | | 283/85 |
| 2016/0140427 A1* | 5/2016 | Keay | .................... | B42D 25/405 |
| | | | | 235/494 |

OTHER PUBLICATIONS

The article "Fluorescence Detection of Counterfeit US Currency" which appeared as an advertising supplement on p. 26 of Molecular Spectroscopy in February of 2004, by Jasco Inc.*

(Continued)

*Primary Examiner* — Daniel A Hess
(74) *Attorney, Agent, or Firm* — Pryor Cashman LLP

(57) ABSTRACT

A method and associated system for authentication, including irradiating an item including a polymer security thread including a polymer material and a doping material within the polymer material and configured to produce a radiation spectrum in response to the irradiating, the doping material capable of absorbing, scattering, or emitting radiation, and detecting the produced radiation spectrum to confirm the presence of the polymer security thread.

20 Claims, 3 Drawing Sheets

(56) References Cited

OTHER PUBLICATIONS

Second copy of "Fluorescence Detection of Counterfeit US Currency" likely also dated from around circa 2004 available at the Jasco website.*
Written Opinion of the International Searching Authority in PCT/US2021/027287 (dated May 7, 2021).
International Search Report in PCT/US2021/027287 (dated May 7, 2021).
Jasco, Inc., "Fluorescence Detection of Counterfeit US Currency," Molecular Spectroscopy (Feb. 2004).
Jasco, Inc., "Fluorescence Detection of Counterfeit US Currency," Application Note (Undated).

* cited by examiner

MACHINE-READABLE POLYMER SECURITY THREADS

TECHNICAL FIELD

The present invention relates generally to products, apparatuses, and methods in which items include polymer security threads containing doping materials, the doping materials being detectable through radiation spectra generated in response to incident radiation.

BACKGROUND OF THE INVENTION

Counterfeiting is a growing concern and, as a result, secure instruments such as banknotes typically have three levels of authentication. Level I authentication is for public uses and is typically in the form of an optical effect, such as optically variable ink or security threads with optical characteristics that are relatively unique and difficult to duplicate. These Level I authentication features include holographic threads and lenticular lens array security threads. Paper banknotes have included Level I authentication features in the form of watermarks.

Similar to Level I authentication features, Level II authentication features are typically known to the public and commercial banks, and include features such as magnetics and fluorescent and phosphorescent inks, which can be read by simple sensors commonly used in ATMs and bill acceptors.

Level III security features are machine readable features and are more sophisticated than Level II authentication features. Level III security features are typically not known to the public and commercial banks and are used to protect against threats from state-sponsored counterfeiters and other well-funded organizations. The covert Level III authentication features are typically either in the form of inks or other features embedded in the substrate of the banknotes.

Over the last two decades, polymer banknotes have gradually been gaining market share in the banknote industry, with over thirty countries using polymer substrates including materials such as biaxially oriented polypropylene (BOPP). The use of polymer substrates has been primarily restricted to lower denominations, as most of the Level III security features that have been employed within paper banknote substrates are not available or suitable for use with polymer banknotes.

Additionally, security threads are used as security features in banknotes, high value documents, and government documents in many countries as well as in product labels and some fabrics. Security threads may be embedded within the banknote or windowed in an alternating manner between being on and within the banknote. Security threads typically have widths ranging from one millimeter to one centimeter.

Security threads are used in all of the top five denominations of United States (US) currency and may emit specific phosphorescence or fluorescence under ultraviolet (UV) excitation. Security threads can also carry de-metalized printing, which may be read under ambient light when the banknote or substrate is examined in transmission.

Security threads can have different constructions ranging from a simple flat strip of a polymer, such as polyethylene terephthalate (PET) or BOPP, having a thickness ranging from 5-50 microns with de-metallization and a phosphor layer or as a sandwich structure including two more layers containing various coatings. There are other variants for security threads that include optical refractive and diffractive structures to create an optical variability when viewed from different angles. Such a security thread is used in the US $100 banknote.

The present invention concerns security features in the form of a machine readable technology for use with polymer security threads in banknotes, including banknotes containing polymer-based substrates.

SUMMARY OF THE INVENTION

In general, in one aspect, the invention features a method for authentication, including irradiating an item including a polymer security thread including a polymer material and a doping material within the polymer material and configured to produce a radiation spectrum in response to the irradiating, the doping material capable of absorbing, scattering, or emitting radiation, and detecting the produced radiation spectrum to confirm the presence of the polymer security thread.

Implementations of the invention may include one or more of the following features. The produced radiation spectrum may be a spectral signature distinct from a spectrum of the irradiating. The method may further include detecting the spectral signature in the produced radiation spectrum, and determining a code associated with the spectral signature. The method may further include comparing the determined code to a reference code, and providing an indication of authenticity if the determined code matches the reference code. The spectral signature may be an absorption or scattering pattern in the produced radiation spectrum. The produced radiation spectrum may include visible light or non-visible electromagnetic radiation. The doping material may be capable of absorbing, scattering, or emitting radiation at a plurality of specific wavelengths to produce the spectral signature. The absorbed, scattered, or emitted radiation at the plurality of specific wavelengths may have different intensities at each of the plurality of specific wavelengths.

The polymer security thread may have a thickness of 5 to 70 microns. The polymer security thread may be disposed in or on a substrate. The substrate may be a paper substrate or a composite polymer-paper substrate. The polymer security thread may be a single layer within the substrate, may be disposed between two layers, or may be windowed in the substrate in an alternating manner. The polymer security thread may be disposed between two layers, and each of the two layers may include a phosphor. The item may be currency.

In general, in another aspect, the invention features a system for authentication, including a radiation source for irradiating an item including a polymer security thread including a polymer material and a doping material within the polymer material and configured to produce a radiation spectrum in response to the irradiating, the doping material capable of absorbing, scattering, or emitting radiation, and a sensor configured to detect the produced radiation spectrum to confirm the presence of the polymer security thread.

Implementations of the invention may include one or more of the following features. The polymer security thread may have a thickness of 5 to 70 microns. The polymer security thread may be disposed in or on a substrate. The substrate may be a paper substrate or a composite polymer-paper substrate. The polymer security thread may be a single layer within the substrate, may be disposed between two layers, or may be windowed in the substrate in an alternating manner. The polymer security thread may be disposed between two layers, and each of the two layers may include a phosphor. The sensor may include an imaging device of a smartphone or a tablet.

DETAILED DESCRIPTION OF THE PREFERRED EMBODIMENTS

Figure 1:
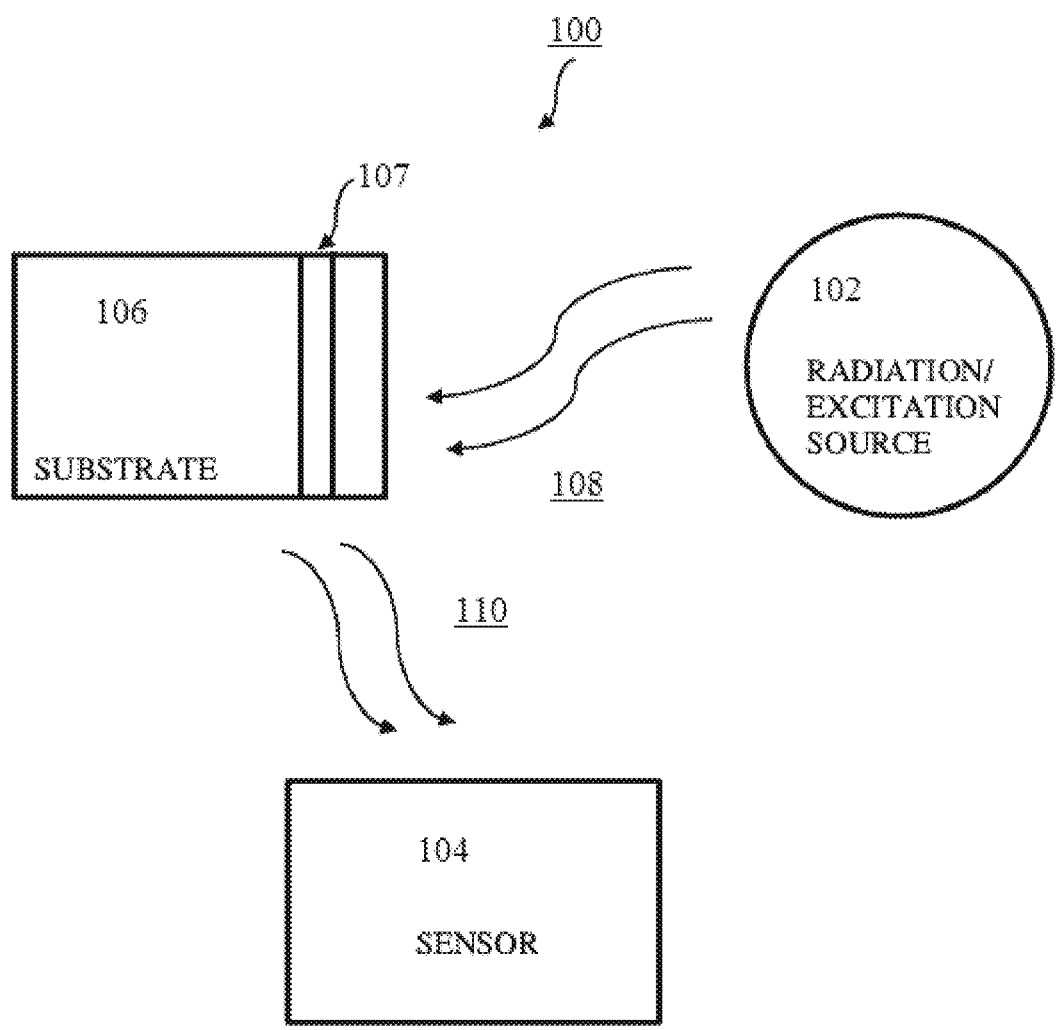
FIG. 1 shows an exemplary authentication system in accordance with embodiments of the invention.

The present invention provides for products, apparatuses, and methods relating to items embedded with polymer security threads having doping materials therein or thereon, and authentication systems and methods using the doped polymer security threads. The doped polymer security threads may be used, e.g., for authenticating secure items, instruments or documents, such as banknotes or currency. In one embodiment of the present invention, the doped polymer security thread is embedded in a substrate and configured as a machine-readable security feature that absorbs or emits, i.e., produces, specific radiation in response to irradiating the substrate from a radiation source, which may be part of an authentication and detection device.

A polymer security thread employed in the present invention may be composed of a polymeric material, including but not limited to polyester or polypropylene, e.g., BOPP. The polymer security thread, as used in, e.g., banknotes or currency, may be approximately 5 to 70 microns in thickness.

Doping materials may be nanometer and micrometer materials added to the polymeric material. The doping materials may be added to the polymeric material during extrusion. The doping materials may be added to or loaded in the polymeric material at 0.01-10% loadings by weight. The doping materials may be inorganics, organics, semiconductor and nanostructures exhibiting exciton, phonon polariton and plasmonic modes, and particularly those that can survive the extrusion temperatures of the polymeric material. The doping materials may optionally be selected to be well matched to the index of refraction of the polymeric material and to maintain the clarity and transparency of the polymeric material. Additionally, the doped polymer security thread may be embedded in a scattering substrate, e.g., paper, such that the clarity or haze of the doped polymer security thread is not critical, unlike embodiments in which the security thread is disposed in a windowed region of the substrate, e.g., banknotes containing polymer-based substrates.

Each doping material may exhibit a unique absorptive or scattering property or signature in the spectrum of incident radiation transmitted through the polymeric material in the region from the far infrared to the long ultraviolet. In particular, the doping materials selectively absorb or scatter incident radiation at specific wavelengths. By combining specific absorption or scattering features of various doping materials, codes for authentication of the security thread and associated items, e.g., banknotes, may be created, including in the form of patterned spectra with notches or other non-uniform features, i.e., absorption or scattering patterns.

In addition, the doping materials may include materials such as phosphors and narrow-band rare-earth and transition metal compounds that emit radiation of a particular wavelength, upon excitation by radiation transmitted directly or laterally through the thread, such as in waveguide modes in the substrate initiated by scattering. The emission features of such doping materials may be combined with the absorption or scattering features of the doping materials to create patterned spectra for the authentication codes. The doping materials may be selected to be index matched with the polymeric material. Alternatively, the doping materials may be selected not to be index matched with the polymeric material to allow for scattering of radiation transmitted through the polymeric material, which may optionally include being at sufficiently low concentrations to maintain the clarity and transparency of the polymeric material, such as with a transparent or colorless polymers, e.g., BOPP.

The doped polymer security thread may be embedded in any industry-acceptable substrate, including paper substrates and composite polymer-paper substrates. The substrate may be covered with an opacity layer to allow for both contrast printing and discharge of static charges. Alternatively, the substrate may include a clear area or window free from opacity, as is often the case in higher denomination banknotes containing polymer-based substrates. The opacity layer of the banknote, either alone or in combination with the area free from opacity, may function as the analog of paper banknote watermark for banknotes containing polymer-based substrates. In one embodiment of the present invention, the doped polymer security thread includes metallized aluminum thereon. The doped polymer security thread may be disposed in the substrate in any industry-acceptable configuration, including but not limited to a single layer, a sandwiched layering (including phosphor-based layers disposed on one or both sides), a windowed arrangement, and the like.

In one embodiment of the present invention, the security thread with doping material embedded therein may be configured to contribute to the functioning of the substrate as a waveguide for radiation transmitted by or through the thread, i.e., through total internal reflection between the upper and lower surfaces of the polymer layer. In particular, the combination of the substrate and the security thread is configured as a planar dielectric waveguide capable of transmitting electromagnetic radiation laterally through the polymer layer in a waveguide mode between the upper and lower surfaces. Incident radiation may enter the thread on or in the substrate through external coupling at the upper or lower surface of the polymer layer followed by internal scattering. Such scattering mediated waveguide coupling is an alternative mode for radiation to enter the planar waveguide of the thread compared to directing the radiation through an edge of the thread. The same mode of scattering can result in external coupling and may be used to decouple radiation transmitted through the substrate containing the security thread for detection. Upon detection, i.e., through decoupling after waveguide transmission, the spectrum of radiation may be detected or analyzed, including for patterns such as notches resulting from narrow-band absorption by the doping material.

The process of authenticating an item such as a banknote including a security thread as described herein may be performed using apparatus capable of generating incident radiation for transmission by or through the thread and detecting radiation transmitted by or through the thread. Such authentication may be performed on high-speed transport mechanisms, such as those used to process currency at a rate of 40 banknotes per second.

Exemplary embodiments of the present invention are generally directed to devices, apparatus, systems, and methods for authentication using doped polymer security threads. Specifically, exemplary embodiments of the present invention use detecting/sensing mechanisms that may be used to authenticate items including a doped polymer security thread. Although the exemplary embodiments of the present invention are primarily described with respect to authentication and/or preventing counterfeiting, it is not limited thereto, and it should be noted that the exemplary doped polymer security thread may be used to encode other types of information for other applications. Further, the exemplary embodiments of the present invention may be used in conjunction with other authentication measures, e.g., holograms, watermarks, and magnetic encoding.

FIG. 1 shows an exemplary system 100 in accordance with embodiments of the present invention. As shown in FIG. 1, system 100 may include a radiation/excitation source 102, a sensor 104, and a substrate 106 having a doped security thread 107. Radiation/excitation source 102 may be any source supplying radiation 108, such as, e.g., visible light, ultraviolet radiation, radio waves, or microwaves, which is to be absorbed and/or scattered by the doped security thread 107. The doped security thread 107 may produce radiation 110 in the same wavelength range or a different wavelength range.

Sensor 104 may include any detecting, sensing, imaging, or scanning device that is able to receive, image or measure the spectrum of the radiation produced by the doped security thread substrate 107, such as a photometer or a digital camera.

According to certain exemplary embodiments of the present invention, radiation/excitation source 102 may include the flash of a digital camera, and sensor 104 may include the optical components and sensors of the digital camera. In one exemplary embodiment, the radiation/excitation source 102 may include the light source of a smartphone or tablet camera, e.g., Apple iPhone, Apple iPad, Samsung Galaxy or other Android devices, and sensor 104 may include the camera of the smartphone or tablet.

Substrate 106 having doped security thread 107 may be included in labels and may be attached or affixed to any product or item, e.g., tax stamps, apparel, currency, or footwear, for which authentication may be desirable.

Figure 2:
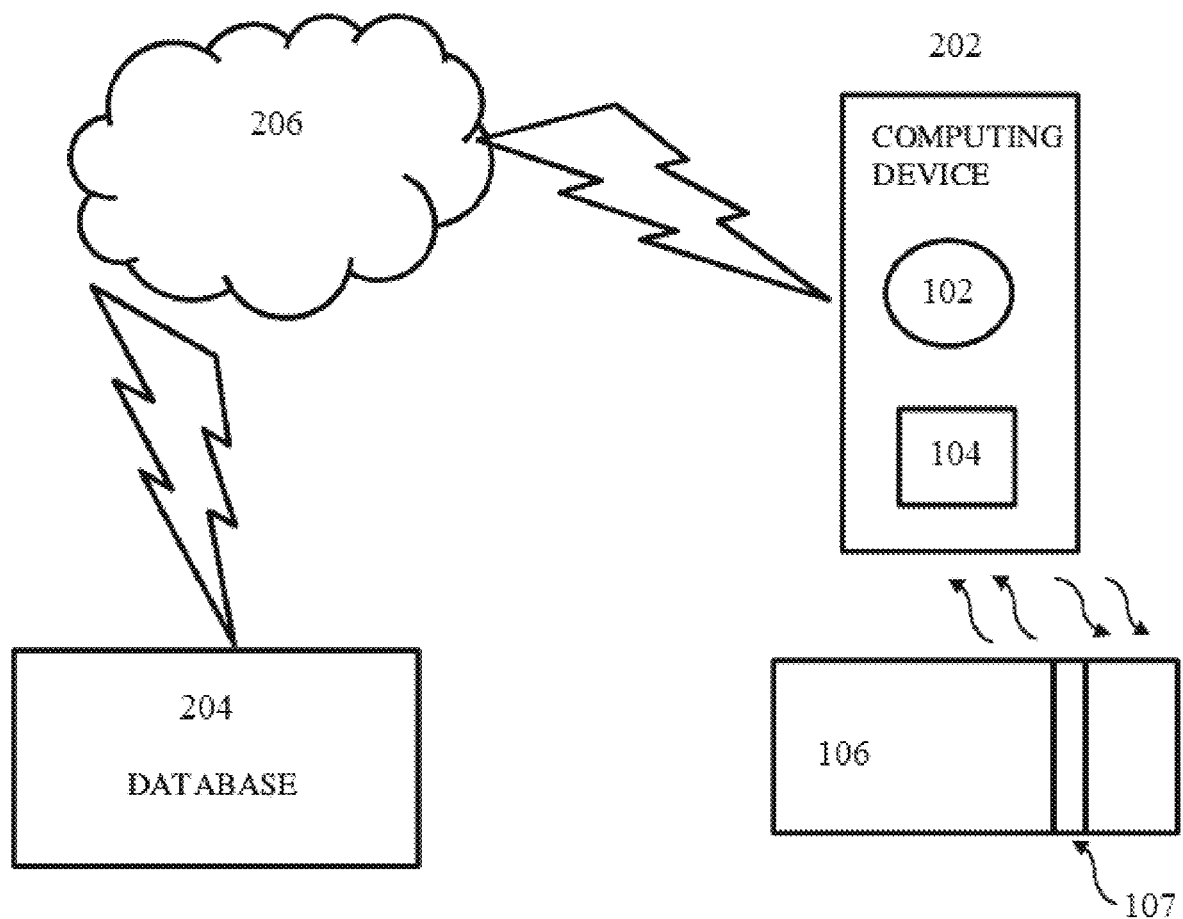
FIG. 2 shows an exemplary system that may be employed to authenticate an item using the method of the present invention.

FIG. 2 shows an exemplary system 200 that may be employed to authenticate an item including a substrate with doped security thread described herein. For example, system 200 includes a computing device 202, which may include radiation/excitation source 102 and sensor 104. Computing device 202 may be any computing device that incorporates a radiation/excitation source 102 and sensor 104, such as a smartphone, a tablet, or a personal data assistant (PDA). Alternatively, radiation/excitation source 102 and sensor 104 may be stand-alone devices that operate independent of a computing device. As described herein, the radiation/excitation source 102 may irradiate a doped security thread, and sensor 104 may measure the radiation produced by the doped security thread, including a spectral signature. In embodiments in which the produced radiation is a spectral signature, the spectral signature may be distinct from an irradiation spectrum associated with a radiation/excitation source, e.g., radiation/excitation source 102. The computing device 202 may determine a code corresponding to the measured spectral signature of the radiation produced by the doped security thread. The processing of the measured spectral signature to determine the code may be performed by a remote computing device. Subsequently, the code or the measured spectral signature may be compared to a database of reference codes or spectral signatures. The database of reference codes may be stored locally on the scanning, imaging, or sensing device or remotely on a separate computing device.

As shown in FIG. 2, to complete the authentication, the computing device 202 may compare the code or the measured spectral intensities to the reference codes or spectral signature stored in a database 204. Although FIG. 2 illustrates this comparison being performed via a network 206 to a remote database 204, other embodiments contemplate database 204 being local to computing device 202.

Further, in some embodiments, the item being authenticated may include an identifying label, such as, e.g., a barcode, a QR code, or a magnetic code, to enable correlation of the code or the measured spectra to the item being authenticated. In a particular embodiment where computing device 202 is a smartphone or tablet, the transmission via the network 206 may be performed over a cellular data connection or a Wi-Fi connection. Alternatively, this can be performed with a wired connection or any other wired or wireless data transport mechanism.

Figure 3:
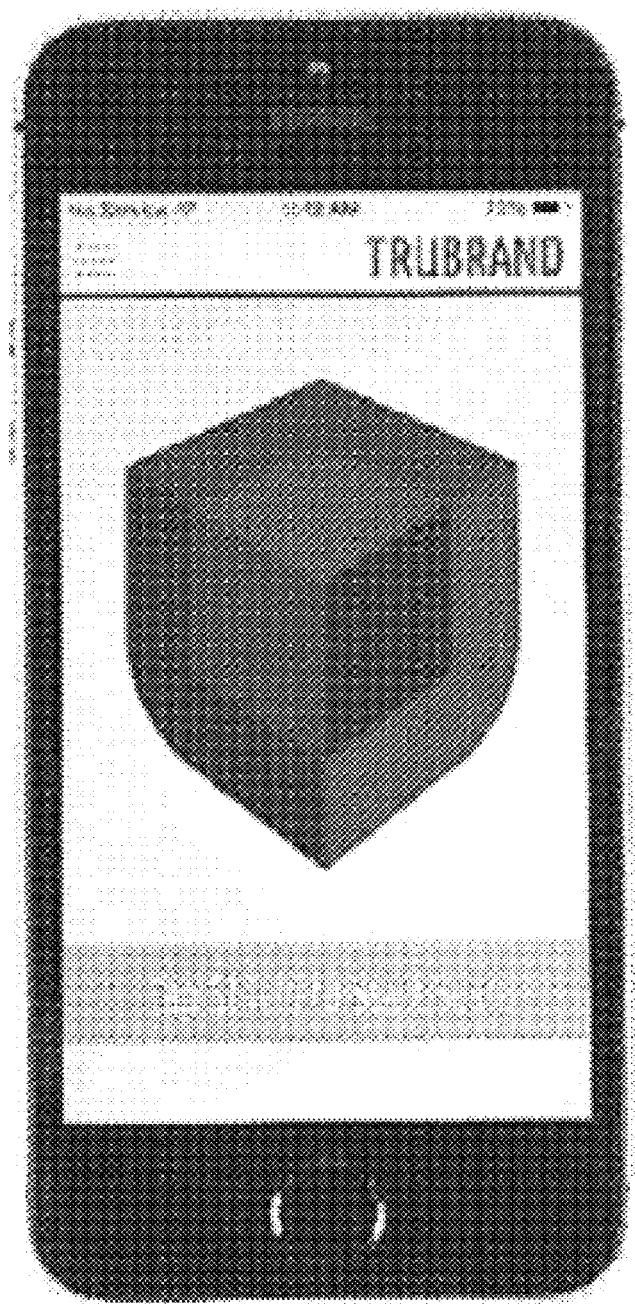
FIG. 3 shows an exemplary screen shot of a software application that may be utilized on a smartphone for authenticating an item in accordance with the present invention.

In certain embodiments of the present invention where a computing device, such as a smartphone or tablet, is utilized for authenticating an item, a software application may be used to simplify the authentication process. FIG. 3 shows a smartphone with an exemplary screen shot of a software application that may be utilized for authenticating an item. The exemplary application may be configured to be executed on any mobile platform, such as Apple's iOS or Google's Android mobile operating system. When the application is run, the software application may provide instructions to a user on properly irradiating or exciting the doped security thread and scanning, imaging, and/or detecting the spectrum produced from the doped security thread. Once the irradiating and scanning of the doped security thread is complete, the application may facilitate comparison of the measured spectral signature or the measured code with a database that stores certain reference codes or spectral signatures to authenticate the item. Further, the application may provide a message or other indicator informing the user of the result of the authentication. For example, the application may provide a text, graphical, or other visual indicator on the screen of the smartphone showing the results of the authentication. Alternatively, the application may provide audible and/or tactile indicators conveying the results of the authentication.

The embodiments and examples above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the accompanying drawings and descriptive matter in which there are illustrated exemplary embodiments of the invention.

What is claimed is:
1. A method for authentication, comprising:
   irradiating an item including a polymer security thread comprising a polymer material and a plurality of various doping materials within the polymer material and configured to produce a radiation spectrum in response to the irradiating, each doping material of the plurality of various doping materials capable of absorbing, scattering, and emitting radiation; and detecting the produced radiation spectrum to confirm the presence of the polymer security thread, wherein the produced radiation spectrum is a spectral signature distinct from a spectrum of the irradiating step, wherein the plurality of various doping materials is capable of absorbing, scattering, and emitting radiation at a plurality of specific wavelengths to produce the spectral signature, wherein the polymer material and the plurality of various doping materials are configured to transmit radiation laterally through the polymer security thread through a waveguide mode, and wherein the spectral signature is in the form of patterned spectra with notches based on absorbing by the plurality of various doping materials.

2. The method of claim 1, further comprising
detecting the spectral signature in the produced radiation spectrum; and
determining a code associated with the spectral signature.

3. The method of claim 2, further comprising
comparing the determined code to a reference code; and
providing an indication of authenticity if the determined code matches the reference code.

4. The method of claim 1, wherein the spectral signature is an absorption and scattering pattern in the produced radiation spectrum.

5. The method of claim 4, wherein the produced radiation spectrum includes visible light.

6. The method of claim 4, wherein the produced radiation spectrum includes non-visible electromagnetic radiation.

7. The method of claim 1, wherein the absorbed, scattered, and emitted radiation at the plurality of specific wavelengths has different intensities at each of the plurality of specific wavelengths.

8. The method of claim 1, wherein the polymer security thread has a thickness of 5 to 70 microns.

9. The method of claim 1, wherein the polymer security thread is disposed in or on a substrate.

10. The method of claim 9, wherein the substrate is a paper substrate or a composite polymer-paper substrate.

11. The method of claim 9, wherein the polymer security thread is a single layer within the substrate, is disposed between two layers, or is windowed in the substrate in an alternating manner.

12. The method of claim 11, wherein the polymer security thread is disposed between two layers, and wherein each of the two layers includes a phosphor.

13. The method of claim 1, wherein the item is currency.

14. A system for authentication, comprising:
an item including a polymer security thread comprising a polymer material and a plurality of various doping materials within the polymer material and configured to produce a radiation spectrum in response to irradiating, each doping material of the plurality of various doping materials capable of absorbing, scattering, and emitting radiation;

a radiation source for irradiating the item; and a sensor configured to detect the produced radiation spectrum to confirm the presence of the polymer security thread, wherein the produced radiation spectrum is a spectral signature distinct from a spectrum of the radiation source, wherein the plurality of various doping materials is capable of absorbing, scattering, and emitting radiation at a plurality of specific wavelengths to produce the spectral signature, wherein the polymer material and the plurality of various doping materials are configured to transmit radiation laterally through the polymer security thread through a waveguide mode, and wherein the spectral signature is in the form of patterned spectra with notches based on absorbing by the plurality of various doping materials.

15. The system of claim 14, wherein the polymer security thread has a thickness of 5 to 70 microns.

16. The system of claim 14, wherein the polymer security thread is disposed in or on a substrate.

17. The system of claim 16, wherein the substrate is a paper substrate or a composite polymer-paper substrate.

18. The system of claim 16, wherein the polymer security thread is a single layer within the substrate, is disposed between two layers, or is windowed in the substrate in an alternating manner.

19. The system of claim 18, wherein the polymer security thread is disposed between two layers, and wherein each of the two layers includes a phosphor.

20. The system of claim 14, wherein the sensor includes an imaging device of a smartphone or a tablet.

* * * * *